United States Patent

[11] 3,607,315

[72] Inventor  Anthony S. Partyka
               Chicago, Ill.
[21] Appl. No. 720,394
[22] Filed     Apr. 10, 1968
[45] Patented  Sept. 21, 1971
[73] Assignee  Kraftco Corporation
               New York, N.Y.

[54] METHOD OF MAKING FROZEN PATTIES
     4 Claims, No Drawings
[52] U.S. Cl. ........................................... 99/195,
                              99/111, 99/192 R, 17/45
[51] Int. Cl. ........................................... A23b 3/06,
                                                        A23l 1/33
[50] Field of Search ........................................... 99/1:2, 111,
                              194, 195, 209, 192; 100/94, 38; 17/45

[56]              References Cited
              UNITED STATES PATENTS
1,881,171  10/1932  Cooley .......................... 99/195 X
1,864,285   6/1932  Taylor ........................... 99/195
2,565,245   8/1951  Lebovitz ........................ 100/38
2,622,034  12/1952  Wills ............................. 99/194 X
2,798,814   7/1957  Rivoche ......................... 99/192
2,916,986  12/1959  Lebovitz ........................ 100/94
2,981,973   5/1961  Elmore .......................... 17/45
2,938,803   5/1960  Gorton, Jr. ..................... 99/195
3,152,915  10/1964  Cover et al. ................... 99/195
3,296,656   1/1967  Self ............................... 17/45
              FOREIGN PATENTS
  496,463  11/1938  Great Britain ................. 99/195

Primary Examiner—Norman Yudkoff
Assistant Examiner—F. E. Drummond
Attorney—Anderson, Luedeka, Fitch, Even and Tabin ABSTRACT: A method for preparing portion controlled patties from fish, particularly shellfish. In the method frozen shellfish are comminuted while frozen to a desired particle size. The frozen particles are mixed with suitable flavoring materials to provide a mix and the mix is then molded into portion controlled patties while the temperature of the mix is maintained below freezing.

METHOD OF MAKING FROZEN PATTIES

The present invention relates generally to shellfish and more particularly relates to a method for the preparation of portion controlled shellfish patties.

The frozen food industry is continually seeking to develop and introduce new frozen food products. A recently developed frozen food product is a portion controlled patty prepared from shrimp, sometimes referred to herein as a shrimp steak. The frozen product is prepared from small (Titi) sized imported shrimp. Titi size shrimp is the commercial term for tiny shrimp which have a count of 90 to 130 shrimp per pound. The patties are prepared by combining Titi size shrimp with suitable flavorings and thereafter printing the shrimp into portion-controlled patties.

The use of imported shrimp, however, presents a considerable problem to the industry in that imported shrimp received from any available foreign source is often found to be infected with extremely high bacterial count. This is attributed to the fact that handling of shellfish at ambient temperatures is extremely difficult without contributing bacterial contamination. Even though the foreign shrimp are frozen after harvesting, they incur sufficient handling at ambient temperatures to incur an extremely high bacterial count. The table below illustrates the bacterial counts which are encountered from shrimp imported from various sources:

|  | Total count (72° F.) | Coliform | Yeast | Mold | Staphylococcus | Coagulase | Salmonella |
|---|---|---|---|---|---|---|---|
| Titi size shrimp from India | 68,000,000 | 10 | 20 | 10 | 3,000,000 | Negative | Negative. |
| Titi size shrimp from China | 20,000,000 | 300 | 6,700 | 1,100 | 1,000,000 | do | Do. |
| Titi size shrimp from Venezuela | 12,000,000 | 10 | 10 | 10 | 3,900,000 | do | Do. |

While it is true that cooking of the shrimp reduces the counts of bacteria found in the shrimp, the above table is an indication that the conditions under which the imported shrimp are harvested and transported are not bacteriologically sound. It would be desirable to provide a more careful control of microbiological contamination of shrimp prior to the incorporation of the shrimp into a product, such as a shrimp steak. Better control of microbiological contamination could be maintained if domestic shrimp were used to prepare the shrimp steaks. However, domestic shrimp are generally too large to be used in preparing shrimp steaks and a grinding step increases the possibility of microbiological contamination. It would therefore be desirable to provide a method for grinding shrimp or other shellfish that limits the possibility of microbiological contamination.

Also, known methods for preparing frozen portion controlled patties from shrimp are not entirely suitable. In accordance with known methods, a processor receives shrimp as frozen blocks. The blocks of shrimp are then permitted to thaw while immersed in cool water by the processor for a period of 5 to 7 hours until the shrimp have become completely unfrozen. The shrimp are then mixed with suitable flavoring materials. It is then necessary to spread the shrimp onto pans and to chill the shrimp to a temperature of about 35° F. to provide a suitable consistency for printing of the shrimp mixture into portion controlled patties. After chilling, the shrimp are transferred from the pans to the hopper of a printing machine and are printed or molded into portion controlled patties which are then breaded. The printing operation is sometimes difficult to control due to a tendency of the shrimp mix to stick to the printing apparatus.

Each of the steps indicated above are potential sites for bacterial contamination. It would be desirable to provide a method for preparing portion controlled patties of shellfish wherein the potential for bacterial contamination is reduced. It would also be desirable to provide a method for preparing shellfish patties from sections or segments of shellfish which are considered too large to be directly incorporated into a patty.

Accordingly, it is an object of the present invention to provide a method for preparing frozen portion controlled patties from shellfish. It is another object of the invention to provide a method for preparing frozen shrimp patties. It is a further object of the invention to provide a method for preparing shellfish patties wherein the bacterial contamination is reduced. It is a still further object of the invention to provide a method for preparing frozen patties from shellfish wherein the shellfish are too large to be directly incorporated into a patty.

These and other objects will become more clear from the following detailed disclosure and the appended claims.

Generally, in a method embodying various of the features of the invention, portion controlled patties are prepared from dehulled, frozen shellfish. The dehulled, frozen shellfish are comminuted while frozen to a desired particle size. The frozen particles of shellfish are mixed with suitable flavoring materials to provide a mix and the mix is then introduced immediately to suitable printing apparatus. Portion controlled patties of the shellfish mix are then printed while the temperature of the mix is maintained below freezing.

The method of the present invention is particularly suitable for preparing portion controlled patties from shrimp, and certain features of the invention will be particularly described with reference to making patties from shrimp. However, it should be understood that the method of the invention is equally adaptable to preparing frozen portion controlled patties from other types of shellfish, such as lobster or crab, or any other fish where it is desirable to use the method of the invention to provide the fish in particulate form.

Commercially available blocks of frozen shrimp are used in the method of the invention. The shrimp may be any size or from any source, but it is preferred to use shrimp which are harvested off the coast of Maine. Such shrimp are harvested during a season which extends from about the first of January to the last of March each year. By utilizing shrimp which are harvested during seasonally cold months, it is possible to provide reduced bacteriological counts on the shrimp. Also, by using domestically harvested shrimp, it is possible to insure that the shrimp are processed and frozen within a reduced period of time and to thus reduce the bacteriological count even further.

More particularly, in the method of the invention, frozen blocks of shrimp are ground to the desired particle size in suitable apparatus, such as high energy impact grinding apparatus, or an auger type meat grinder. When high energy type grinding apparatus, such as a hammer mill, is used to effect a reduction in particle size of the shrimp, it is preferred to maintain the temperature of the shrimp below at least about 28° F. At higher temperatures, the work energy imparted to the shrimp during grinding may increase the temperature of the shrimp to thawing conditions and the possibility of contamination is increased. The operation of high energy compact-type grinding apparatus is such that efficiency of grinding of the frozen shrimp is increased as the temperature of the shrimp is decreased below freezing. As the temperature of the frozen shrimp which are to be fed to the impact type grinding apparatus is lowered below freezing they become more friable and easier to grind. Consequently, in a particularly preferred embodiment of the invention, frozen shrimp are removed from freezing apparatus and are ground to the desired particle size in high energy impact-type grinding apparatus before the temperature of the shrimp has risen substantially above that temperature maintained in the freezing apparatus. For this embodiment of the invention the temperature of the shrimp is not increased above about 10° F. during the grinding step.

When auger-type meat grinding apparatus is used to effect grinding of the shrimp it is necessary that the shrimp be at a temperature of from about 15° F. to about 28° F. during grinding. At lower temperatures, the meat grinder will not usually operate. Therefore, when a meat grinder is to be used, frozen shrimp which are removed from commercial freezers at a temperature of −10° F. are permitted to warm for a period of about 2 to 3 hours to permit the temperature of the shrimp to increase to within the indicated range.

The particle size and texture of the ground shrimp may be varied by the selection of grinding apparatus and the selection of conditions of operation of the apparatus. For example, an auger-type meat grinder operates by accepting material from a hopper and extruding the material by the action of the auger through a plate which is provided with a plurality of holes. The selection of the size of holes in the plate determines the fineness of grind. This type of apparatus provides fairly fine particles with a shredded, compacted appearance.

It is sometimes desired to provide at least a portion of the particles of shrimp produced by grinding of a size that is comparable to the Titi size of shrimp. This size particle is most easily produced with high energy impact type grinding apparatus, such as a hammer mill. In a preferred embodiment of the invention the conditions of grinding frozen shrimp in a hammer mill are adjusted to provide ground shrimp having about 20 percent by weight of particles which are comparable to Titi size shrimp with the remaining particles being smaller.

The shrimp particles are then transferred to suitable mixing apparatus where they are combined with other ingredients for preparing the portion controlled patties. Because of the low temperature of the shrimp particles, the ingredients which are introduced to the mixer to be mixed with the shrimp particles tend to lump and to prohibit uniform dispersion of the ingredients with the shrimp particles. Single and double arm dough mixers are found to be most suitable, and sigma-type mixers are also suitable.

During the mixing step the particles of shrimp are maintained at a temperature below freezing. It will be readily understood that when the other ingredients to be mixed with the shrimp particles are at ambient temperature that the level of the other ingredients that can be added to the shrimp particles is limited to that level which will not raise the temperature of the mix above freezing. For example, when the temperature of the shrimp particles is about 28° F., the shrimp particles should comprise at least 80 percent by weight of the mix. Lower levels of shrimp particles may be used if the temperature of the shrimp particles is reduced or it the temperature of the other ingredients is reduced prior to mixing.

It is desirable to incorporate a binding agent into the mix which is to be made into the patties. A preferred binding agent is an alginate, either sodium or calcium alginate. The use of a binding agent, however, is not essential if a more loose, open texture is desired in the final product. When used the binding agent is added at a level of from about 0.2 to about 0.5 percent by weight of the mix.

The mix of ingredients at a temperature below about 28° F. is then transferred to suitable printing or molding apparatus. The printing apparatus preferably includes means for breading the printed patties with a light coating of bread or cracker crumbs. After printing, the patties of shrimp, at a temperature still below freezing, are packaged and the packages are immediately transferred to freezing apparatus where the temperature is reduced to a level suitable for cold storage, such as below about 0° F.

The following examples further illustrate various features of the invention, but are intended to in no way limit the scope of the application, which is defined in the appended claims.

EXAMPLE I

The process of the invention is used to prepare 100 pounds of a shrimp mix suitable for making portion controlled patties. The shrimp mix has the following ingredients:

| Ingredients | Weight Percent |
| --- | --- |
| Frozen shrimp portion controlled | 87.44 |
| Cracker meal | 9.62 |
| Spices | 2.97 |
| Calcium alginate | 0.44 |
| Water | 0.44 |

The shrimp are removed from a freezer which is maintained at a temperature of −10° F. The frozen shrimp are allowed to stand for a period of 2 hours until they have reached a temperature of 15° F. The shrimp are then removed from the polyethylene bags in which they are packaged and are loaded into the hopper of an auger-type grinding machine. The grinding machine is equipped with a plate provided with a plurality of ¾-inch holes.

The ground shrimp at a temperature of 22° F. are collected in a sterilized stainless steel container and are transferred to a double paddle mixer. The cracker meal, spices, calcium alginate and water are preblended and are then gradually added to the ground shrimp, as the mixer is operated to provide a shrimp mix. After blending, the shrimp mix at a temperature of 25° F. is transferred to a printing machine. The shrimp mix is then printed into portion controlled patties which are subsequently battered and breaded.

The portion controlled shrimp patties are then packaged and transferred to a freezer for storage. After storage for a period of 6 weeks the shrimp patties are examined to determine the level of microbiological contamination. The total microbiological count is less than 4,000. The shrimp patties are then prepared for eating by deep frying at a temperature of 350° F. for 3 minutes. A delicious product is obtained with a mild shrimp flavor.

EXAMPLE II

Shrimp patties are prepared by the method of Example I with the exception that the frozen shrimp are ground in a hammer mill while at a temperature of less than 0° F. The hammer mill is provided with a plurality of ⅛-inch wide flat hammers which are revolved at a speed of 1750 r.p.m. A screen is located over the outlet of the hammer mill. The screen is provided with a plurality of 1 inch holes.

The shrimp particles obtained are coarser than the particles obtained in Example I. When shrimp patties are then made with these particles in accordance with Example I, shrimp patties are provided with a stronger, more characteristic shrimp taste than the shrimp patties of Example I.

Various of the features of the invention are defined in the appended claims.

It is claimed that:

1. A method of preparing portion controlled patties from frozen blocks of shellfish comprising the steps of comminuting or grinding frozen shellfish to provide particles of shellfish, said comminuting step providing particles of frozen shellfish having at least 20 percent by weight of the particles comparable in size to whole shrimp which have a count of from about 90 to 130 shrimp per pound, the remainder of said particles being smaller, mixing said particles of frozen shellfish with flavoring materials to provide a mix and forming said mix into portion controlled patties, said shellfish being maintained at a temperature of from about −10° F. to about 28° F. during each of said steps.

2. A method in accordance with claim 1 wherein said frozen shrimp are comminuted by means of a high energy impact mill.

3. A method in accordance with claim 2 wherein said high energy impact mill is a hammer mill.

4. A method in accordance with claim 1 wherein said comminuting step is performed by means of an auger-type meat grinder, said frozen shellfish being provided at a temperature of from about 15° F. to about 28° F. to said grinder.